(12) United States Patent
Wu et al.

(10) Patent No.: US 11,770,162 B2
(45) Date of Patent: Sep. 26, 2023

(54) UPLINK TRANSMISSIONS IN WIRELESS COMMUNICATIONS

(71) Applicant: ZTE Corporation, Guangdong (CN)

(72) Inventors: Hao Wu, Guangdong (CN); Chuangxin Jiang, Guangdong (CN); Zhaohua Lu, Guangdong (CN); Yu Ngok Li, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 17/567,790

(22) Filed: Jan. 3, 2022

(65) Prior Publication Data
US 2022/0200671 A1 Jun. 23, 2022

Related U.S. Application Data

(63) Continuation of application No. PCT/CN2019/094721, filed on Jul. 4, 2019.

(51) Int. Cl.
*H04B 7/0456* (2017.01)
*H04L 5/00* (2006.01)
(Continued)

(52) U.S. Cl.
CPC ........ *H04B 7/0456* (2013.01); *H04L 5/0046* (2013.01); *H04L 5/0048* (2013.01); *H04W 72/0453* (2013.01); *H04W 72/23* (2023.01)

(58) Field of Classification Search
CPC ... H04L 5/0053; H04L 5/0092; H04L 25/023; H04L 27/2613; H04L 5/0048;
(Continued)

(56) References Cited

U.S. PATENT DOCUMENTS 10,567,049 B2 2/2020 Li et al.
11,095,342 B2 8/2021 Park et al.
(Continued)

FOREIGN PATENT DOCUMENTS

CN 102158976 A 8/2011
CN 103327610 A 9/2013
(Continued)

OTHER PUBLICATIONS

International Search Report and Written Opinion dated Apr. 2, 2020 for International Application No. PCT/CN2019/094721, filed on Jul. 4, 2019 (7 pages).
(Continued)

*Primary Examiner* — Eva Y Puente
(74) *Attorney, Agent, or Firm* — Perkins Coie LLP

(57) ABSTRACT

Methods, apparatus, and systems for using multiple messages by the base station to indicate sub-band information without incurring big signaling overhead are described. In one example aspect, a wireless communication method includes receiving, by a user device from a base station, a first message that includes a first set of information for configuring a transmission from the user device to the base station. The first message includes one or more fields indicating an association between the first message and a second message for configuring the transmission. The method includes receiving, by the user device, the second message from the base station. The second message includes a second set of information for configuring the transmission. The method also includes performing the transmission based on the first and the second set of information.

12 Claims, 9 Drawing Sheets

(51) Int. Cl.
*H04W 72/0453* (2023.01)
*H04W 72/23* (2023.01)

(58) Field of Classification Search
CPC ... H04L 5/0007; H04L 25/0202; H04L 5/005; H04L 1/0061; H04W 72/23; H04W 72/0446; H04W 72/0453; H04W 72/20; H04W 72/12; H04W 72/21; H04W 72/04; H04W 72/1273; H04B 7/024; H04B 7/0695; H04B 7/0617; H04B 7/06; H04B 7/088; H04B 7/2603; H04B 7/0626; H04B 7/0628; H04B 7/0408
USPC .......................................................... 375/262
See application file for complete search history.

(56) References Cited

U.S. PATENT DOCUMENTS

| | | | |
|---|---|---|---|
| 11,129,152 B2* | 9/2021 | You | H04L 5/0053 |
| 11,582,779 B2 | 2/2023 | Chen et al. | |
| 2013/0294547 A1* | 11/2013 | Lane | H04L 27/2647 375/340 |
| 2016/0128028 A1 | 5/2016 | Mallik et al. | |
| 2017/0230994 A1 | 8/2017 | You et al. | |
| 2018/0092070 A1 | 3/2018 | Liao et al. | |
| 2018/0220408 A1 | 8/2018 | Novak et al. | |
| 2018/0227156 A1* | 8/2018 | Papasakellariou | H04L 5/0053 |
| 2020/0059905 A1 | 2/2020 | Tang | |
| 2021/0274521 A1* | 9/2021 | Yuan | H04L 1/0004 |

FOREIGN PATENT DOCUMENTS

| | | |
|---|---|---|
| CN | 105450273 A | 3/2016 |
| CN | 105992376 A | 10/2016 |
| CN | 108112078 A | 6/2018 |
| CN | 109787667 A | 5/2019 |
| CN | 109923907 A | 6/2019 |
| EP | 3367725 A1 | 8/2018 |
| WO | 2017/061744 A1 | 4/2017 |

OTHER PUBLICATIONS

Chinese office action issued in CN Patent Application No. 201980097451.2, dated May 19, 2023, 13 pages. English translation included.
European Search Report for EP Patent Application No. 19936465.4, dated Feb. 27, 2023, 7 pages.

* cited by examiner

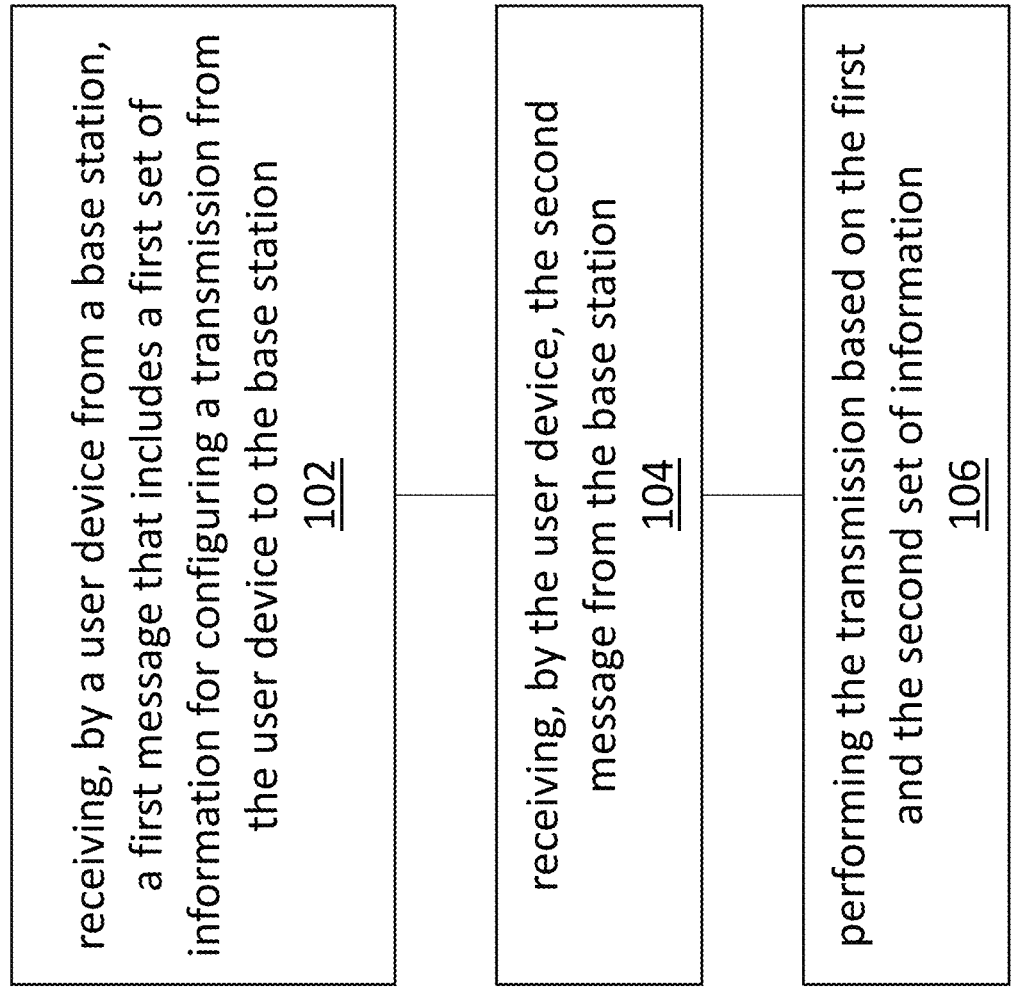

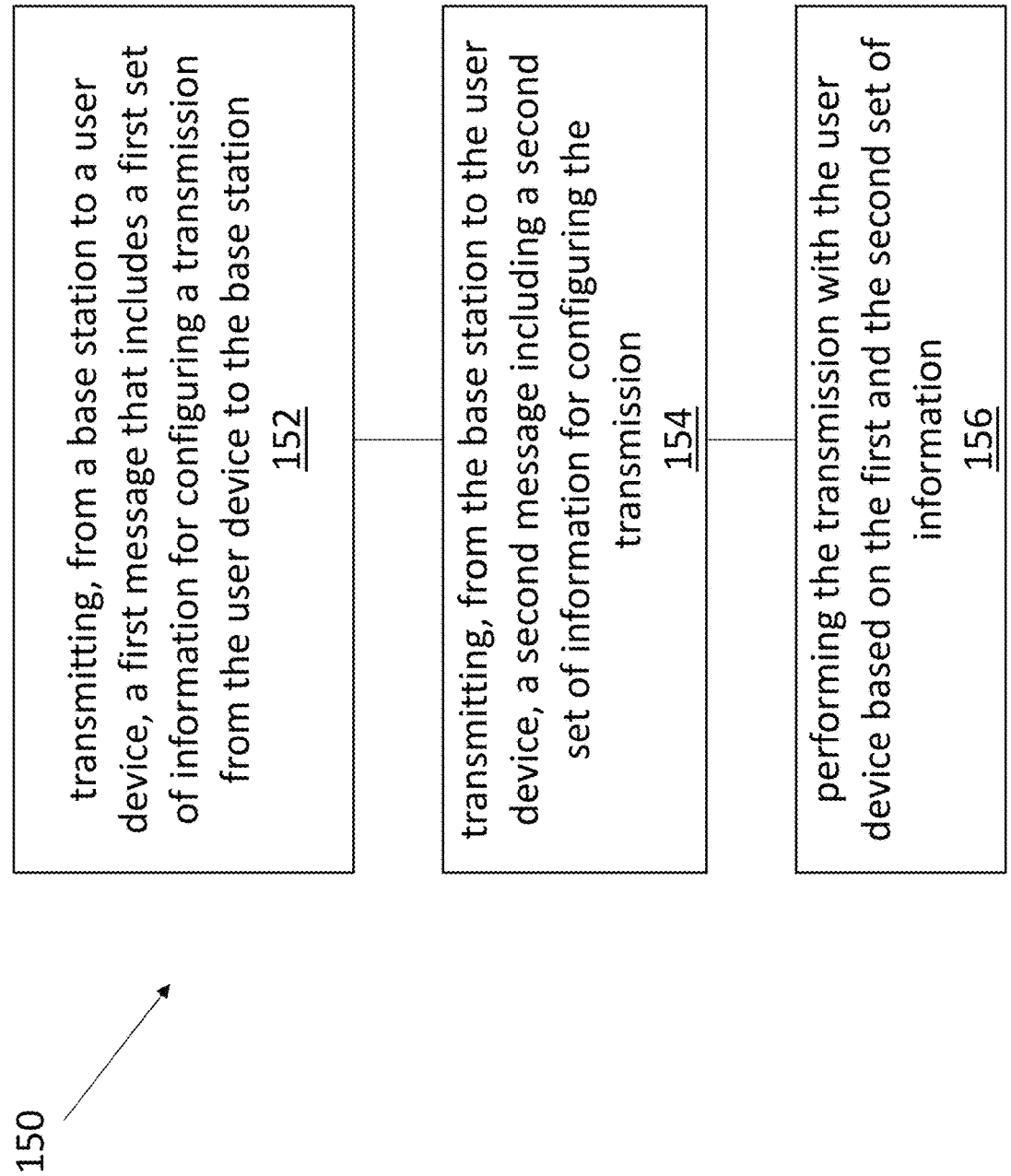

UPLINK TRANSMISSIONS IN WIRELESS COMMUNICATIONS

CROSS-REFERENCE TO RELATED APPLICATIONS

This application is a continuation of International Patent Application No. PCT/CN2019/094721, filed on Jul. 4, 2019, the contents of which are incorporated herein by reference in their entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques for using multiple control messages by the base station to indicate sub-band information without incurring big signaling overhead.

In one example aspect, a wireless communication method is disclosed. The method includes receiving, by a user device from a base station, a first message that includes a first set of information for configuring a transmission from the user device to the base station. The first message includes one or more fields indicating an association between the first message and a second message for configuring the transmission. The method includes receiving, by the user device, the second message from the base station. The second message includes a second set of information for configuring the transmission. The method also includes performing the transmission based on the first and the second set of information.

In another example aspect, a wireless communication method is disclosed. The method includes transmitting, from a base station to a user device, a first message that includes a first set of information for configuring a transmission from the user device to the base station. The first message includes at least one field indicating an association between the first message and a second message for configuring the transmission. The method includes transmitting, from the base station to the user device, a second message including a second set of information for configuring the transmission. The method also includes performing the transmission with the user device based on the first and the second set of information.

The following examples list techniques preferably implemented by some embodiments. In some embodiments, the first set of information includes a wideband precoding information and the second set of information includes a sub-band precoding information. In some embodiments, a precoding matrix is represented by W=W1·W2, W1 including a set of vectors and W2 including phase information, wherein the wideband precoding information includes a precoding matrix index with respect to W1, and wherein the sub-band precoding information indicates sub-band phase information of each sub-band. In some embodiments, a precoding matrix is represented by W=W1·W2, W1 including a set of vectors and W2 including phase information, wherein the wideband precoding information includes a precoding matrix index with respect to W1 and phase information with respect to W2, and wherein the sub-band precoding information indicates a difference between sub-band phase information of each sub-band and the wideband phase information with respect to W2. In some embodiments, a precoding matrix is represented by W, wherein the wideband precoding information includes a precoding matrix index with respect to W, and wherein the sub-band precoding information indicates a difference between a sub-band precoding matrix index of each sub-band and the wideband precoding matrix index with respect to W.

In some embodiments, a time-domain position of a second search space of the second message is determined based on an offset between a first search space of the first message and the second search space of the second message. The offset can be represented by a number of slots or a number of symbols in time domain. In some embodiments, the at least one field of the first message indicates whether the user device is to monitor the second message on a downlink control channel. The at least one field can include one or more frequency domain resource allocation fields indicating a number of frequency domain resources to be used by the transmission, the number of frequency domain resources being greater than or equal to a predetermined threshold. The at least one field can indicate at least one transmit precoding matrix indicator, a number of layers, or a combination thereof. The at least one field can indicate an aggregation level or a physical downlink control channel candidate of the second message.

In some embodiments, the method includes determining, according to the first message, at least one of a physical downlink control channel candidate or an aggregation level of the second message and monitoring the second message based on the physical downlink control channel candidate or the aggregation level. In some embodiments, at least one of a physical downlink control channel candidate or an aggregation level of the second message is determined based on the first message. The aggregation level or the physical downlink control channel candidate of the second message can be determined based on at least one of: a payload size of the second message, one or more fields of the first message, a target code rate, or a control channel parameter of the first message. One field of the at least one field of the first message can indicate a combination of the aggregation level and the physical downlink control channel candidate of the second message. The aggregation level or the physical downlink control channel candidate of the second message can be determined based on one field of the at least one field of the first message, the one field further indicating one or more transmit precoding matrix indicators, a number of layers, or a combination thereof.

In some embodiments, the first message is positioned prior to a transmission resource of a physical channel for the transmission, and wherein a time-domain distance between the first message and the transmission resource is greater than or equal to S+N symbols, S and N being positive integers. The second message can be positioned prior to the transmission resource of the physical channel for the transmission, and wherein a time-domain distance between the second message and the transmission resource is greater than or equal to S symbols. A search space of the second message can be a user device specific search space.

In another example aspect, a wireless communication method is disclosed. The method includes receiving, by a user device from a base station, a first message that includes a first set of sub-band information for configuring a first set of transmission resources associated with one or more transmissions from the user device to the base station. The first message is associated with a second message for configuring a second set of transmission resources associated with the one or more transmissions from the user device to the base station. The method includes receiving, by the user device, the second message from the base station. The second message includes a second set of sub-band information for configuring the one or more transmissions from the user device to the base station. The method also includes performing the one or more transmissions based on the first and the second set of sub-band information.

In another example aspect, a wireless communication method is disclosed. The method includes transmitting, from a base station to a user device, a first message that includes a first set of sub-band information for configuring a first set of transmission resources associated with one or more transmissions from the user device to the base station. The first message is associated with a second message for configuring a second set of transmission resources associated with the one or more transmissions from the user device to the base station. The method includes transmitting, from the base station to the user device, the second message including a second set of sub-band information for configuring the one or more transmissions from the user device to the base station. The method also includes performing the one or more transmissions with the user device based on the first and the second set of sub-band information.

The following examples list techniques preferably implemented by some embodiments. The one or more transmissions can include a single transmission having multiple parts. The one or more transmissions can include multiple transmissions. The first set of transmission resources configured by the first message and the second set of transmission resources configured by the second message cab be frequency-domain multiplexed. The first set of transmission resources and the second set of transmission resources can occupy the same time-domain locations. The first message and the second message can indicate a same bandwidth part for the one or more transmissions.

In some embodiments, the association between the first message and the second message includes an association between a first control resource set corresponding to the first message and a second control resource set corresponding to the second message. In some embodiments, the association between the first message and the second message can include an association between a first search place of the first message and a second search space of the second message. In some embodiments, the association between the first message and the second message includes an association between a first configuration of a physical channel corresponding to the first message and a second configuration of the physical channel corresponding to the second message. A number of resource blocks configured by the first message or the second message can be smaller than or equal to a predefined or configured upper limit. A bitwidth of one or more fields of the first or the second message can be determined based on the predefined or configured upper limit. In some embodiments, the one of more fields include at least a frequency domain resource allocation field, wherein a mapping between (1) a resource indicator value and (2) at least one of a starting resource block or a length of allocated frequency-domain resources is determined based on the predefined or configured upper limit.

In another example aspect, a communication apparatus is disclosed. The apparatus includes a processor that is configured to implement an above-described method.

In yet another example aspect, a computer-program storage medium is disclosed. The computer-program storage medium includes code stored thereon. The code, when executed by a processor, causes the processor to implement a described method.

These, and other, aspects are described in the present document.

BRIEF DESCRIPTION OF DRAWINGS

FIG. 1A is a flowchart representation of a method for wireless communication in accordance with the present technology.

FIG. 1B is another flowchart representation of a method for wireless communication in accordance with the present technology.

DETAILED DESCRIPTION

Figure 2:
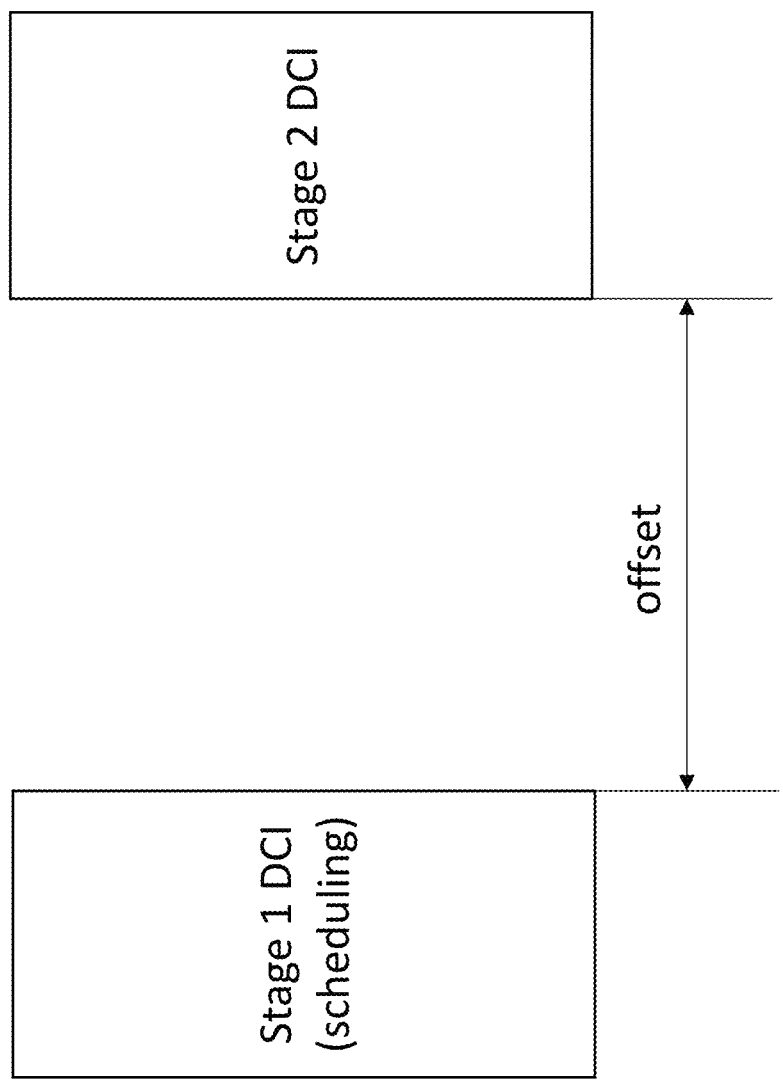
FIG. 2 illustrates an example two-stage Downlink Control Information (DCI) signaling in accordance with the present technology.

Section headings are used in the present document only to improve readability and do not limit scope of the disclosed embodiments and techniques in each section to only that section. Certain features are described using the example of 5G wireless protocol. However, applicability of the disclosed techniques is not limited to only 5G wireless systems.

For the closed-loop spatial multiplexing in wireless communications, the base station sends the scheduled user equipment (UE) the information about what precoding matrix is used as a part of downlink control information. This information field is denoted as the Transmit Precoding Matrix Indicator (TPMI). Currently, if the TPMI indicates a precoding matrix, the indicated precoding matrix is applied to all frequency resources allocated. The frequency resources can include resource blocks, resource block groups, sub-bands, etc. This is also referred to as wideband precoding information.

However, using the wideband precoding information may not sufficient to match channel differences in uplink frequency resources, which can result in performance loss. The disclosed techniques can be implemented in various embodiments to provide sub-band precoding information. For example, the base station can transmit sub-band precoding information to the terminal using one or more DCI messages. The terminal can use different precoding matrices for different sub-bands of the frequency domain resources. The disclosed techniques also address the issue of signaling overhead introduced by signaling sub-band information, thereby achieving higher uplink transmission performance.

Some examples of the disclosed techniques are described in the following example embodiments. Hereinafter, Frequency Domain Resource Allocation (FDRA) can be categorized into one or more types. For example, Type 1 FDRA can be used to referred to FDRA that indicates the starting Resource Block (RB) position and the number of consecutive RBs. Type 0 FDRA can be used to referred to FDRA that indicates the multiple RBGs, each including a set of consecutive RBS. In some embodiments, the base station uses one or more bitmaps to indicate or schedule RBGs for FDRA. The term sub-band is to define a set of frequency-domain resources. The same precoding information can be used for the frequency-domain resources in each sub-band. For example, a sub-band can include a set of RBs. The same precoding information is used for the transmission associated with the RBs in each sub-band. Wideband precoding information can also include the number of layers.

Embodiment 1

One main problem of signaling sub-band precoding information in downlink control information is that it can bring large signaling overhead. For different layers, the number of precoding matrices can be different. Furthermore, the number of sub-bands for different FDRAs may also be different. Thus, the signaling overhead of sub-band precoding information indication is variable rather than fixed. One way to address the overhead issue is to use multi-stage DCI signaling. That is, DCI messages are transmitted in multiple stages. The signaling cost of the n+1th stage DCI message is indicated by information carried in the n-stage DCI message. Thus, the terminal can ascertain the signaling overhead of the next stage DCI overhead through the current stage, thereby improving downlink control resource utilization.

FIG. 1A is a flowchart representation of a method 100 for wireless communication in accordance with the present technology. The method 100 includes, at operation 102, receiving, by a user device from a base station, a first message that includes a first set of information for configuring a transmission from the user device to the base station. The first message includes one or more fields indicating an association between the first message and a second message for configuring the transmission. It is noted that the transmission can be configured either by higher layer configuration or physical layer configuration. For example, information of the physical layer configuration can be indicated in downlink control information. The method 100 includes, at operation 104, receiving, by the user device, the second message from the base station. The second message includes a second set of information for configuring the transmission. The method 100 also includes, at operation 106, performing the transmission based on the first and the second set of information.

FIG. 1B is another flowchart representation of a method 150 for wireless communication in accordance with the present technology. The method 150 includes, at operation 152, transmitting, from a base station to a user device, a first message that includes a first set of information for configuring a transmission from the user device to the base station. The first message includes at least one field indicating an association between the first message and a second message for configuring the transmission. The method 150 includes, at operation 154, transmitting, from the base station to the user device, a second message including a second set of information for configuring the transmission. The method 150 includes, at operation 156, performing the transmission with the user device based on the first and the second set of information.

In some embodiments, the method includes based on an offset between a first search space of the first message and a second search space of the second message, determining a time-domain position of the second search space of the second message. The offset can be represented by a number of slots or a number of symbols in time domain.

In some embodiments, the method includes determining, based on the one or more fields of the first message, whether to monitor the second message on a downlink control channel. In some embodiments, the one or more fields can include one or more frequency domain resource allocation fields indicating a number of frequency domain resources to be used by the transmission, the number of frequency domain resources being greater than or equal to a predetermined threshold. In some embodiments, the one or more fields can indicate one or more transmit precoding matrix indicators, a number of layers, or a combination thereof. In some embodiments, the one or more fields can indicate an aggregation level or a physical downlink control channel candidate of the second message.

In some embodiments, the method further includes determining, according to the first message, at least one of a physical downlink control channel candidate or an aggregation level of the second message; and monitoring the second message based on the physical downlink control channel candidate or the aggregation level. In some embodiments, the aggregation level or the physical downlink control channel candidate of the second message is determined based on at least one of: a payload size of the second message, one or more fields of the first message, a target code rate, or a control channel parameter of the first message. In some embodiments, the one of the one or more fields of the first message indicates a combination of the aggregation level and the physical downlink control channel candidate of the second message. In some embodiments, the aggregation level or the physical downlink control channel candidate of the second message is determined based on one field of the one or more fields of the first message, the one field further indicating one or more transmit precoding matrix indicators, a number of layers, or a combination thereof.

In some embodiments, the first message is positioned prior to a transmission resource of a physical channel for the transmission, and a time-domain distance between the first message and the transmission resource is greater than or equal to S+N symbols, S and N being positive integers. In some embodiments, the second message is positioned prior to the transmission resource of the physical channel for the transmission, and wherein a time-domain distance between the second message and the transmission resource is greater than or equal to S symbols. In some embodiments, N can be the time-domain offset between the first search space of the first message and the second search space of the second message In some embodiments, a search space of the second message is a user device specific search space.

FIG. 2 illustrates an example two-stage DCI signaling in accordance with the present technology. The first stage DCI can be a DCI message that schedules a first transmission, such as a Physical Uplink Shared Channel (PUSCH) transmission. For example, the first stage DCI has the format 0_1 according to the New Radio (NR) standard. The first stage DCI provides some information about resource scheduling, such as FDRA information. In some embodiments, the wideband precoding information is also indicated in the first stage DCI message. The second stage DCI is then used to indicate sub-band precoding information, such as precoding matrix index on each sub-band.

In some embodiments, the first stage DCI message is a scheduling DCI message to schedule and configure control channel resource(s), search space(s), and how the terminal(s) monitor the DCI. For example, the first stage DCI message can adopt one of the existing formats, such as format 0_1 in the NR standard.

In some embodiments, the payload size of the second stage DCI message is determined according to the information indicated by the first stage DCI, such as TPMI, Transmit Rank Indicator (TRI), and/or FDRA information, etc. The control channel resources of the second stage DCI can be determined by configuring the CORESET resource. In particular, the Resource Element Group (REG) and Control Channel Element (CCE) resources can be indicated to determine the number of frequency domain resources and time domain symbols occupied by the CORESET.

In some embodiments, the search space of the second stage DCI can be determined by a time domain offset configured by at least one of the following methods:

Method 1: The time domain offset can be configured by the base station. The base station configures the search space period of the second stage DCI. The base station also configures an offset value for the terminal to determine the time-domain location of the slot/symbols.

Method 2: The time domain offset can be indicated by the first-stage DCI message. The terminal determines the search space location of the second-stage DCI according to time domain offset in the first-stage DCI message and the second-stage DCI search space. For example, the time domain offset can be the number of time slots or the number of time domain symbols between the second stage DCI search space and the first stage DCI search space, as shown in FIG. 2.

In some embodiments, the search space of the second stage DCI and the first stage DCI can be associated by at least one of the following ways:
- configuring the search space or search space identifier (ID) of the second stage DCI in the first stage DCI search space configuration information;
- configuring the search space ID of the first stage DCI in the second stage DCI search space configuration information; or
- configuring the first stage DCI search space ID and the second stage DCI search space configuration information in the configuration information associated with the transmission (e.g., the PUSCH transmission). For example, the second stage DCI search space configuration information can include one or more search space ID(s).

In some embodiments, the terminal determines, according to the one or more fields in the first-stage DCI message, whether it is necessary to monitor a second-stage DCI message. For example, at least one of the following methods can be employed:

The one or more of the fields of the first stage DCI include an FDRA field. In some implementations, if the number of frequency domain resources indicated by the FDRA field is less than a predefined threshold, or the frequency domain resource range is less than a predetermined threshold, the second phase DCI does not need to be monitored. For example, the predetermined threshold can be a fixed value or configured by a higher layer parameter.

The one or more of the fields of the first stage DCI include a TPMI or TRI field. In some implementations, if the TPMI/TRI field indicates a reserved state or a predetermined state, the second-stage DCI needs to be monitored. Otherwise, the second phase does not need to be monitored. As another example, if the TPMI/TRI field indicates wideband precoding information, then the second-stage DCI need not be monitored.

The one or more of the fields of the first stage DCI include an explicit field to indicate whether it is necessary to monitor the second-stage DCI.

The one or more of the fields of the first stage DCI include a field indicating information of the second-stage DCI message. For example, one field can be used to indicate the Aggregation Level (AL) and/or the Physical Downlink Control Channel (PDCCH) candidate of the second-stage DCI. As another example, the said field can further include an explicit indicator to indicate whether it is necessary to monitor the second-stage DCI.

In some embodiments, if the terminal fails to detect the first-stage DCI during a monitoring opportunity of the first-stage DCI, it is not necessary to monitor the second-stage DCI. In some embodiments, if the terminal fails to detect the second-stage DCI as indicated by the first-stage DCI, the terminal can use the precoding information indicated by the first-stage DCI, such as the wideband precoding information, to perform the transmission (e.g., a PUSCH transmission).

The terminal can monitor the second stage DCI using at least one of the following methods:

Method A: The terminal determines the payload size of the second-stage DCI according to the first-stage DCI. The terminal then determines the AL of the second-stage DCI according to the payload size and/or the target code rate of the second-stage DCI. In some embodiments, the terminal further determines, according to the AL, the PDCCH candidate of the second-stage DCI based on one of the following methods:

Method A1: The base station can indicate, either explicitly or implicitly, the PDCCH candidate of the second-stage DCI using the first-stage DCI. In some embodiments, the base station can use the TPMI/TRI field to implicitly indicate the PDCCH candidate of the second-stage DCI. For example, the TPMI/TRI field can indicate wideband precoding information. A set of corresponding reserved states or a set of predetermined states in the wideband precoding information can be used to indicate the PDCCH candidate. As another example, the base station can use an explicit field in the first-stage DCI to indicate the PDCCH candidate of the second-stage DCI.

Method A2: The base station and the terminal can determine the PDCCH candidate of the second-stage DCI according to predetermined rules. For example, one or more control channel parameters of the first-stage DCI can be used to determine the PDCCH candidate. The control channel parameters include at least one of CORESET information, PDCCH candidate information, and/or CCE information.

Method Mode A3: The terminal determines the PDCCH candidate of the second-stage DCI by blind detection.

Method B: The base station can indicate, either explicitly or implicitly, the PDCCH candidate and the AL of the second-stage DCI using the first-stage DCI. For example, the AL and PDCCH candidate can indicated by joint coding. That is, one DCI state indicates a combination of AL and PDCCH candidate. Table 1 shows an example of joint coding of AL and PDCCH candidate of the second-stage DCI. In some embodiments, the number of AL and PDCCH candidates combinations can be configured by higher layer signaling. Further, the candidate set of combinations of AL and PDCCH candidates can be configured by higher layer signaling.

TABLE 1

Example joint coding of AL and PDCCH candidate of the second-stage DCI

| DCI state in first-stage DCI | AL | PDCCH candidate |
|---|---|---|
| 000 | | No Stage-2 DCI |
| 001 | 1 | 0 |
| 010 | 1 | 1 |
| 011 | 1 | 2 |
| 100 | 2 | 0 |
| 101 | 2 | 1 |
| 110 | 2 | 2 |
| 111 | 4 | 0 |

In some embodiments, the AL and PDCCH candidate can be implicitly indicated by a field in the first-stage DCI, such as the TPMI/TRI field. For example, the TPMI/TRI field can be used to indicate wideband precoding information. The reserved state(s) or the predefined state(s) in the wideband precoding information can used to indicate the AL and the PDCCH candidate of the second-stage DCI.

Method C: The terminal determines the AL and PDCCH candidate by blind detection.

In some embodiments, to address the issue of variable signaling cost, the payload size of the second-stage DCI is padded to a fixed length. For example, when the payload of the second-stage DCI is less than 12 bits, the payload can be padded to 12 bits using zero bits.

In some embodiments, the second stage DCI and its associated transmission have a timing association. Specifically, the second-stage DCI is positioned prior to the resource(s) for the transmission, and a time-domain distance between the second-stage DCI and the transmission resource(s) is greater than or equal to S symbols. In some embodiments, if the first-stage DCI indicates a second-stage DCI, the first-stage DCI and its associated transmission also have a timing association. Specifically, the first-stage DCI is positioned prior to the transmission resource(s) for the transmission, and a time-domain distance between the first-stage DCI and the transmission resource(s) is greater than or equal to S+N symbols, S and N being positive integers. In some implementations, N is determined based on the time-domain offset between the search space of the second-stage DCI and the search space of the first-stage DCI. In some implementation, the timing association between the second-stage DCI and its associated transmission is indicated by the TDRA information in the first-stage DCI.

In some embodiments, the second stage DCI is associated with a UE-specific search space. In some embodiments, the first phase DCI may indicate a Bandwidth Part (BWP) switch. That is, the BWP indicated in the first-stage DCI is different than the currently activated BWP. The signaling of the second-stage DCI and the BWP switch can be handled by one of the following methods:

In some embodiments, the first stage DCI cannot indicate the BWP switch and the second stage DCI simultaneously.

In some embodiments, the first stage DCI and the second stage DCI are in the same BWP. If the first stage DCI indicates a BWP switch, the BWP switch starts after the last time domain symbol of the second stage DCI. In addition, the sub-band precoding information is used according to the FDRA of the target BWP.

If the first stage DCI indicates a BWP switch, the second phase DCI is transmitted on the target BWP before the PUSCH transmission. The second stage DCI indicates the sub-band precoding information according to the frequency domain scheduling of the first phase DCI on the target BWP. In addition, the time difference between the second stage DCI and the first symbol of the PUSCH transmission is T. The scheduling time offset indicated by the first stage DCI is at least T+GP, where GP is the BWP switching time.

Embodiment 2

The base station and the terminal indicate the precoding information by using the agreed codebooks. The DCI messages indicate the indices of wideband or the sub-band precoding information with respect to the codebooks.

The precoding codebook can be divided into three codebook subsets that can be fully correlated, partially correlated, and/or uncorrelated. For the fully correlated codebook subsets and the partial correlation codebook subsets, the precoding matrix indicated by each precoding indication information can be written into a two-level codebook form $W=W_1 \cdot W_2$. For a fully correlated codebook subset, W1 includes the Discrete Fourier Transform (DFT) vector or the Kroneck product of the DFT vector. For the partial correlation codebook subset, W1 includes the unit vector. W2 includes phase information.

For the fully correlated codebook subsets and the partial correlation codebook subsets, in some embodiments, the wideband precoding information includes a precoding matrix index with respect to W1. The sub-band precoding information indicates sub-band phase information of each sub-band.

In some embodiments, the wideband precoding information includes a precoding matrix index with respect to W1 and phase information with respect to W2. The sub-band precoding information indicates a difference between sub-band phase information of each sub-band and the wideband phase information with respect to W2.

In some embodiments, the wideband precoding information includes a precoding matrix index with respect to W, and the sub-band precoding information indicates a difference between a sub-band precoding matrix index of each sub-band and the wideband precoding matrix index with respect to W.

In some embodiments, the wideband precoding information is indicated in the first stage DCI and the sub-band precoding information is indicated in the second stage DCI.

For the uncorrelated codebook subsets, each column of the precoding matrix indicated by precoding information is a unit vector (that is, a single level codebook). In some embodiments, for non-correlated codebook subsets, there is no sub-band precoding information (that is, there is no second stage DCI). The terminal thus does not need to monitor the second stage DCI. In some embodiments, for a non-correlated codebook subset, the sub-band precoding information indicates a codebook index on each sub-band. In some embodiments, for the non-correlated codebook subset, the wideband precoding information indicates the wideband codebook index, and the sub-band precoding information indicates the difference between the codebook index and the wideband codebook index on each sub-band.

Embodiment 3

Figure 3A:
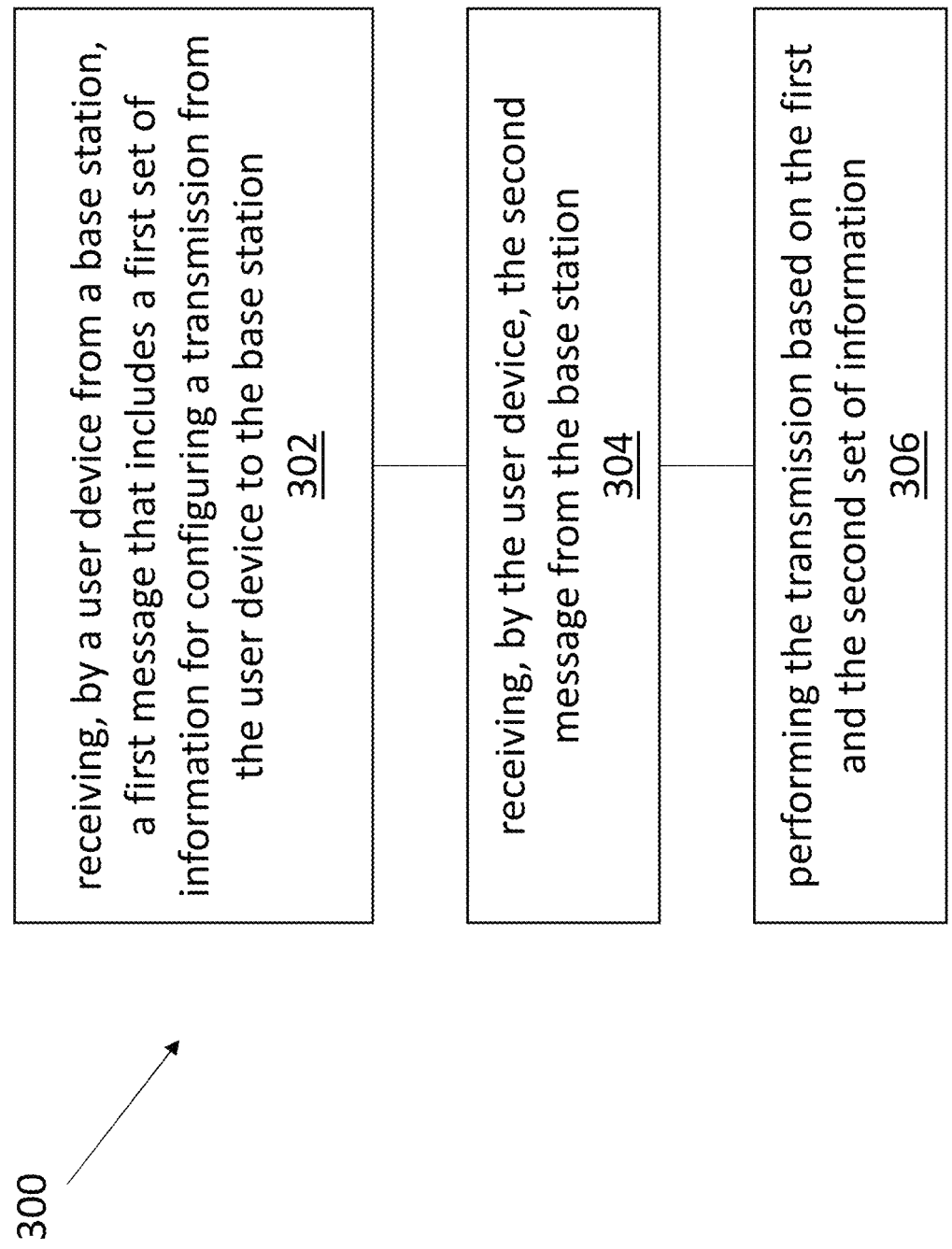
FIG. 3A is a flowchart representation of a method for wireless transmission in accordance with the present technology.

As an alternative mechanism to the multi-stage DCI signaling, multiple independent DCI messages can be used to indicate sub-band precoding information. FIG. 3A is a flowchart representation of a method for wireless transmission in accordance with the present technology. The method 300 includes, at operation 302, receiving, by a user device from a base station, a first message that includes a first set of sub-band information for configuring a first set of transmission resources associated with one or more transmissions from the user device to the base station. The first message is associated with a second message for configuring a second set of transmission resources associated with the one or more transmissions from the user device to the base station. The method 300 includes, at operation 304, receiving, by the user device, the second message from the base station. The second message includes a second set of sub-band information for configuring the one or more transmissions from the user device to the base station. The method 300 includes, at operation 306, performing the one or more transmissions based on the first and the second set of sub-band information. It is noted that the transmission can be configured either by higher layer configuration or physical layer configuration. For example, information of the physical layer configuration can be indicated in downlink control information. In some embodiments, the one or more transmissions include a single transmission having multiple parts. In some embodiments, the one or more transmissions include multiple transmissions.

Figure 3B:
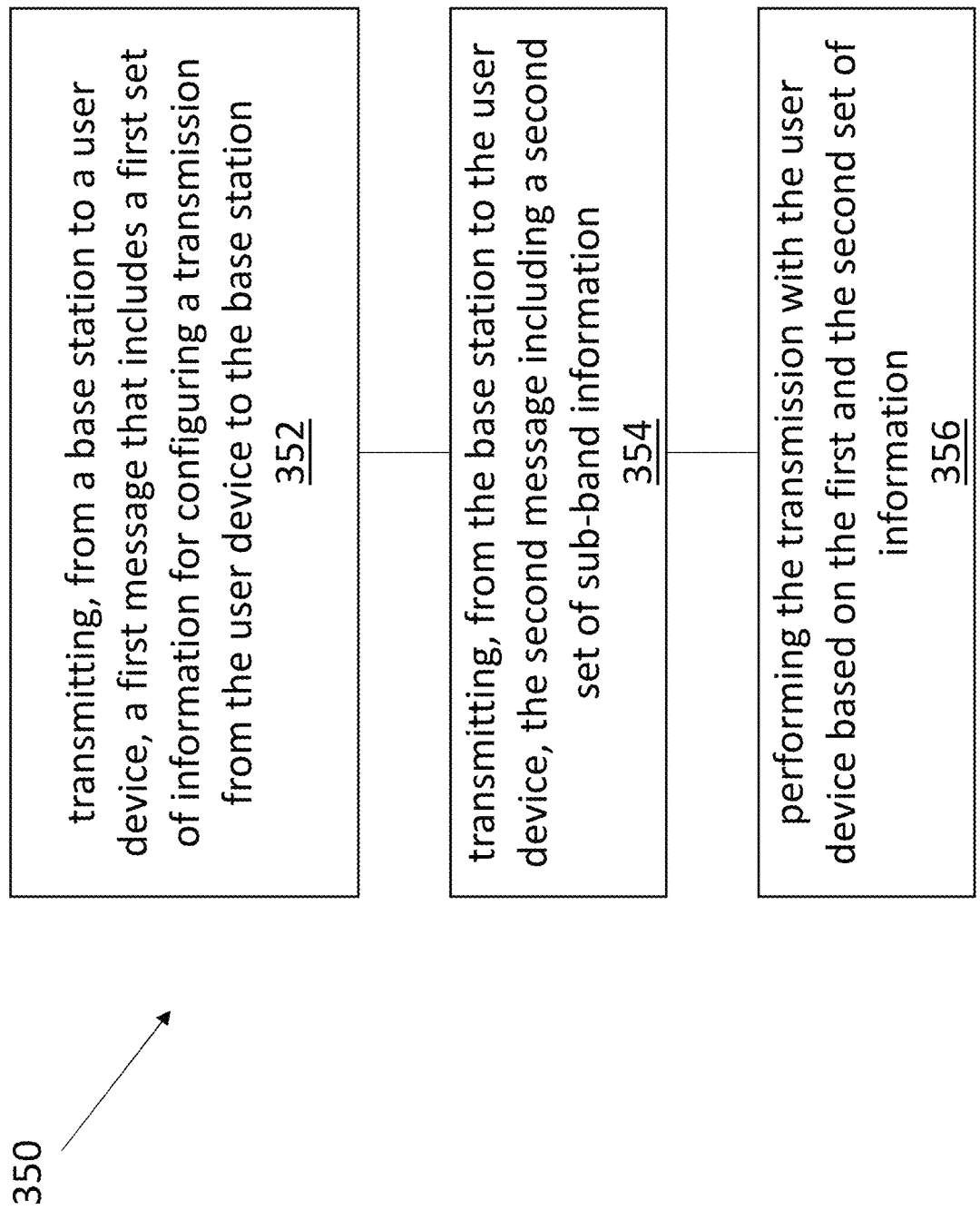
FIG. 3B is another flowchart representation of a method for wireless transmission in accordance with the present technology.

FIG. 3B is a flowchart representation of a method for wireless transmission in accordance with the present technology. The method 350 includes, at operation 352, transmitting, from a base station to a user device, a first message that includes a first set of sub-band information for configuring a first set of transmission resources associated with one or more transmissions from the user device to the base station. The first message is associated with a second message for configuring a second set of transmission resources associated with the one or more transmissions from the user device to the base station. The method 350 includes, at operation 354, transmitting, from the base station to the user device, the second message including a second set of sub-band information for configuring the one or more transmissions from the user device to the base station. The method 350 includes, at operation 356, performing the one or more transmissions with the user device based on the first and the second set of sub-band information.

In some embodiments, the first set of transmission resources configured by the first message and the second set of transmission resources configured by the second message are frequency-domain multiplexed. The first set of transmission resources and the second set of transmission resources can occupy the same time-domain locations. In some embodiments, the first message and the second message indicate a same bandwidth part for the one or more transmissions.

In some embodiments, the association between the first message and the second message includes an association between a first control resource set corresponding to the first message and a second control resource set corresponding to the second message. In some embodiments, wherein the association between the first message and the second message includes an association between a first search place of the first message and a second search space of the second message. In some embodiments, the association between the first message and the second message includes an association between a first configuration of a physical channel corresponding to the first message and a second configuration of the physical channel corresponding to the second message.

In some embodiments, a number of resource blocks configured by the first message or the second message is smaller than or equal to a predefined or configured upper limit. In some embodiments, a bitwidth of one or more fields of the first or the second message is determined based on the predefined or configured upper limit. In some embodiments, the one of more fields include at least a frequency domain resource allocation field, wherein a mapping between (1) a resource indicator value and (2) at least one of a starting resource block or a length of allocated frequency-domain resources is determined based on the predefined or configured upper limit.

For example, multiple associated DCIs can schedule one or more transmissions (e.g., PUSCH transmissions) independently. In some cases, multiple transmissions are scheduled. In some embodiments, one transmission with multiple parts is scheduled. Each DCI can include corresponding FDRA information. The scheduled resources are Frequency Domain Multiplexed (FDM). Each DCI indicates sub-band precoding information within a scheduled frequency range.

In some embodiments, the base station transmits two associated DCIs. The two DCIs are associated by at least one of the following ways:

The first DCI corresponds to the first CORESET group and the second DCI corresponds to the second CORESET group. The two CORESET groups are associated with each other. For example, the first CORESET group ID is configured in the second CORESET group. Alternatively, the second CORESET group ID is configured in the first CORESET group. In some embodiments, dedicated configuration element is used to contain the two CORESET group configurations.

The first DCI corresponds to the first search space and the second DCI corresponds to the second search space. The two search spaces are associated with each other. For example, the first search space ID is configured in the second search space. Alternatively, the second search space ID is configured in the first search space. In some embodiments, dedicated configuration element is used to contain the two search space configurations.

The first DCI corresponds to the first PUSCH configuration and the second DCI corresponds to the second PUSCH configuration. The two PUSCH configurations are associated with each other. For example, the first PUSCH configuration ID is configured in the second PUSCH configuration. Alternatively, the second PUSCH configuration ID is configured in the first PUSCH configuration. In some embodiments, dedicated configuration element is used to contain the two PUSCH configurations.

Figure 4:
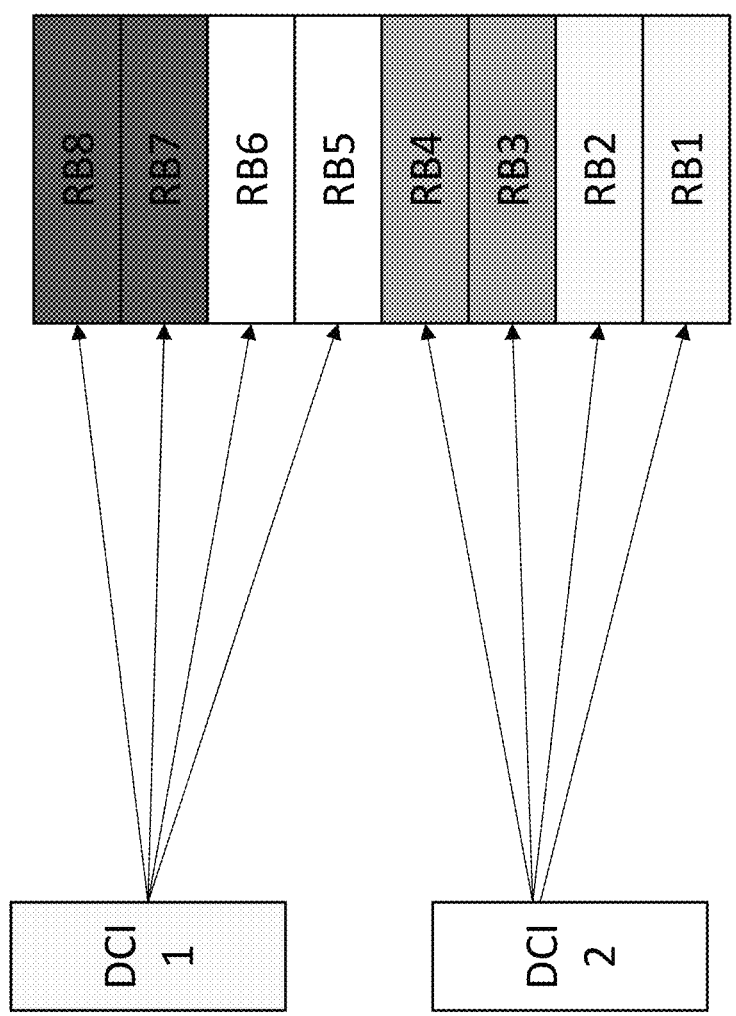
FIG. 4 shows an example of frequency-domain multiplexed transmission resources in accordance with the present technology.

In some embodiments, the two DCIs schedule two PUSCH transmissions. The two PUSCH transmissions can be transmitted at the same time but the transmission resources are frequency domain multiplexed. FIG. 4 shows an example of FDM transmission resources in accordance with the present technology. In FIG. 4, the PUSCH transmission resources scheduled by the two DCI satisfy at least one of the following conditions:

1. The scheduled resources can be transmitted using the same set of time domain symbols. For example, the BWP indicated by the two DCI messages can be the same BWP. The scheduled transmission resources do not overlap in the frequency domain. As another example, the scheduled resources have the same spatial relation or uplink (UL) Transmission Configuration Indication (TCI).

2. There is an upper limit for the maximum number of RBs scheduled in each DCI. For example, the base station can configure the upper limit through high-level signaling such as CORESET group configuration or the search space configuration. For Type 1 FDRA, the bitwidth of the DCI message can be determined by the upper limit of the RB number. If the BWP includes N RBs and the upper limit for the number of RBs is M (M<=N), then the bitwidth of Type 1 FDRA can be $$\left\lceil \log_2 \frac{M(2N-M+1)}{2} \right\rceil.$$

In some embodiments, there is a mapping between the Resource Indicator Value (RIV) and the starting RB, denoted as $RB_s$, and/or length L in terms of contiguously allocated resource blocks for Type 1 FDRA. For example, if $$RB_s \le N - M + \left\lfloor \frac{M}{2} \right\rfloor, RIV = \left(N - M + \left\lfloor \frac{M}{2} \right\rfloor\right)(L-1) + RB_s.$$

Otherwise, $$RIV = \left(N - M + \left\lfloor \frac{M}{2} \right\rfloor\right)(M - L + 1) + (2N - M - RB_s).$$

In some embodiments, $RB_s$ is an integer. L≥1 and does not exceed M or N−$RB_s$.

3. The number of sub-bands per DCI is configured by the base station. For example, it can be configured in the CORESET group or search space configuration. The sub-band size is determined by the number of sub-bands and the bandwidth allocation.

In some embodiments, the base station can divide the frequency domain resources in the entire BWP into two frequency domain parts (FPs) through high layer signaling. Each DCI separately allocates frequency domain resources in the corresponding frequency domain part. For example, the base station configures two frequency domain parts: FP1 and FP2. FP1 is associated with DCI 1 and FP2 is associated with DCI 2. The FP can be configured by CORESET group, search space, or PUSCH configuration of each associated DCI.

The terminal can determine the RBs in each FP according to the high layer signaling. The FP can be determined at least one of the following ways:

The RBs included in each FP are continuous. The configuration of the FP includes the starting position and the number of RBs.
The RBs included in each FP are discontinuous and are indicated by a bitmap.

The FP are determined according to a predefined rule. For example, each FP includes N RB groups, each RB group includes M consecutive RBs, and adjacent RB groups are separated by L RBs, etc. The N, M, and L values can be signaled by the base station or be predefined. Alternatively, the base station indicates the RB group included in the FP through a bitmap.

In some embodiments, the bitwidth of the FDRA is determined according to the configured FP. For Type 1 FDRA, the RBs included in each FP can be consecutive RBs. The FDRA bitwidth in each DCI can be $\lceil \log_2(N_{FP}(N_{FP}+1)/2) \rceil$. For Type 0 FDRA, the RBGs included in each FP can be indicated by a bitmap. Each FP includes $N_{FP}^{RBGs}$ and the bitwidth of the FDRA is $N_{FP}^{RBG}$.

In some embodiments, because the multiple transmissions or multiple parts in a single transmission are frequency-domain multiplexed, the total power for the transmission(s) can be limited. The power of each transmission (or transmission part) is determined by the corresponding power control parameters and the power control formula respectively. If the two transmissions or transmission parts are transmitted simultaneously (scheduled on the same set of time domain symbols), the total power of the two transmissions is limited to a value such as less than or equal to Pcmax.

Embodiment 4

This embodiment provides an example way of dividing the scheduled frequency domain resources into sub-bands. In sub-band precoding information, the frequency domain resources for the PUSCH transmission(s) are divided into one or more sub-bands and the precoding of each sub-band remains unchanged. The manner of dividing the frequency domain resources into one or more sub-bands includes at least one of the following methods:

Method 1: The terminal determines the number of sub-bands through high layer signaling by the base station. For example, the size of the sub-band is determined according to the number of RBs included in the FDRA information. As another example, the size of the sub-band is determined according to the continuous frequency domain range indicated by the FDRA information. The size of the sub-band can be same as or an integer multiple of RBG.

Figure 5:
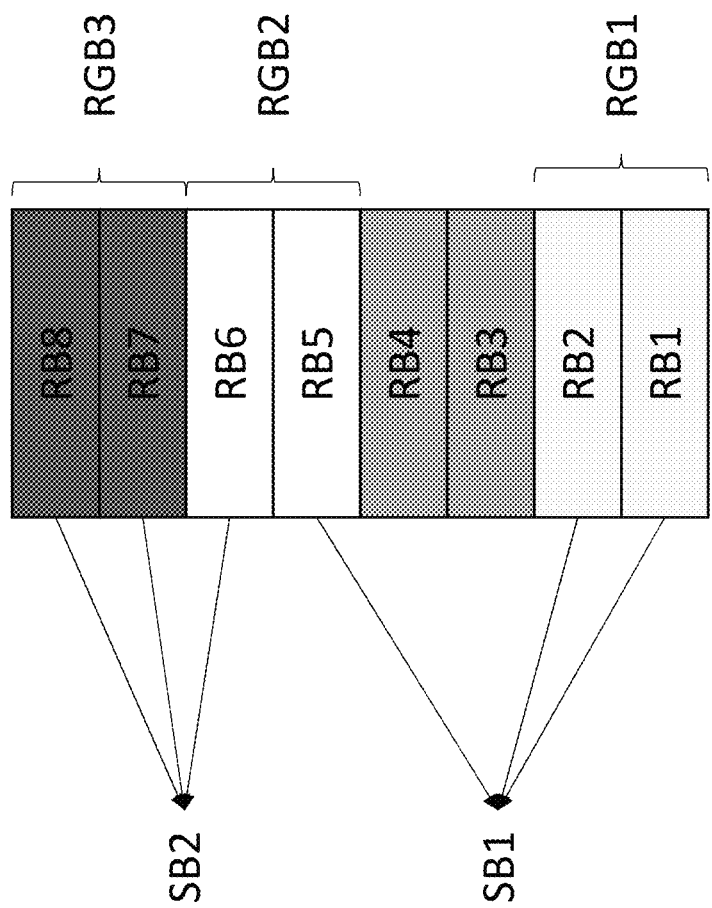
FIG. 5 illustrates an example problem of determining sub-band size according to the number of resource blocks.

An important issue using this method is how to determine the sub-band size of Type 0 FDRA. Type 0 is non-contiguous FDRA scheme. The entire BWP is divided into multiple RBGs, with each RBG containing 2, 4, or more RBs. The number of RBs in each RBG can be determined according to bandwidth and/or higher layer signaling. FIG. 5 illustrates an example problem of determining sub-band size of Type 0 FDRA according to the number of RBs. Here, the RB in the first sub-band (SB1) is divided into two parts: the first part being RB5 and the second part being RB1 and RB2. The interval between the two parts is large, while RB5 and the second sub-band (SB2) are in fact adjacent to each other. Thus, if RB5 and RB1/2 are precoded with the same sub-band information, the performance is not as good as pre-coding RB5 to be a part of SB2.

To address this issue, one method is adding an RB or RBG to a second sub-band if the distance between the RB (or RBG) in the first sub-band and its nearest neighbor in the original sub-band is greater than a certain threshold G and the distance between the RB (or RBG) and its nearest neighbor in the second sub-band is less than G. The value of G may be a fixed value. The value of G may also be configured by a higher layer signaling message. In some embodiments, G is the distance between the RB and its nearest neighbor in the second sub-band. Alternatively, if the distance between the RB (or RBG) and its nearest neighboring in the same sub-band exceeds a threshold, the RB (or RBG) is precoded using wideband precoding information.

Another method is to determine the sub-band size according to the high layer signaling (or according to the BWP bandwidth). In some embodiments, the number of sub-bands is determined according to FDRA information. When at least one RB of a sub-band is indicated by the FDRA information, sub-band precoding information is indicated for the sub-band. For Type 0 FDRA, the sub-band size can be the RBG size or an integer multiple of the RBG size.

In some embodiments, for the above two methods, when the DCI indicates a BWP switch, the sub-band TPMI is applied according to the FDRA information of the target BWP.

Figure 6:
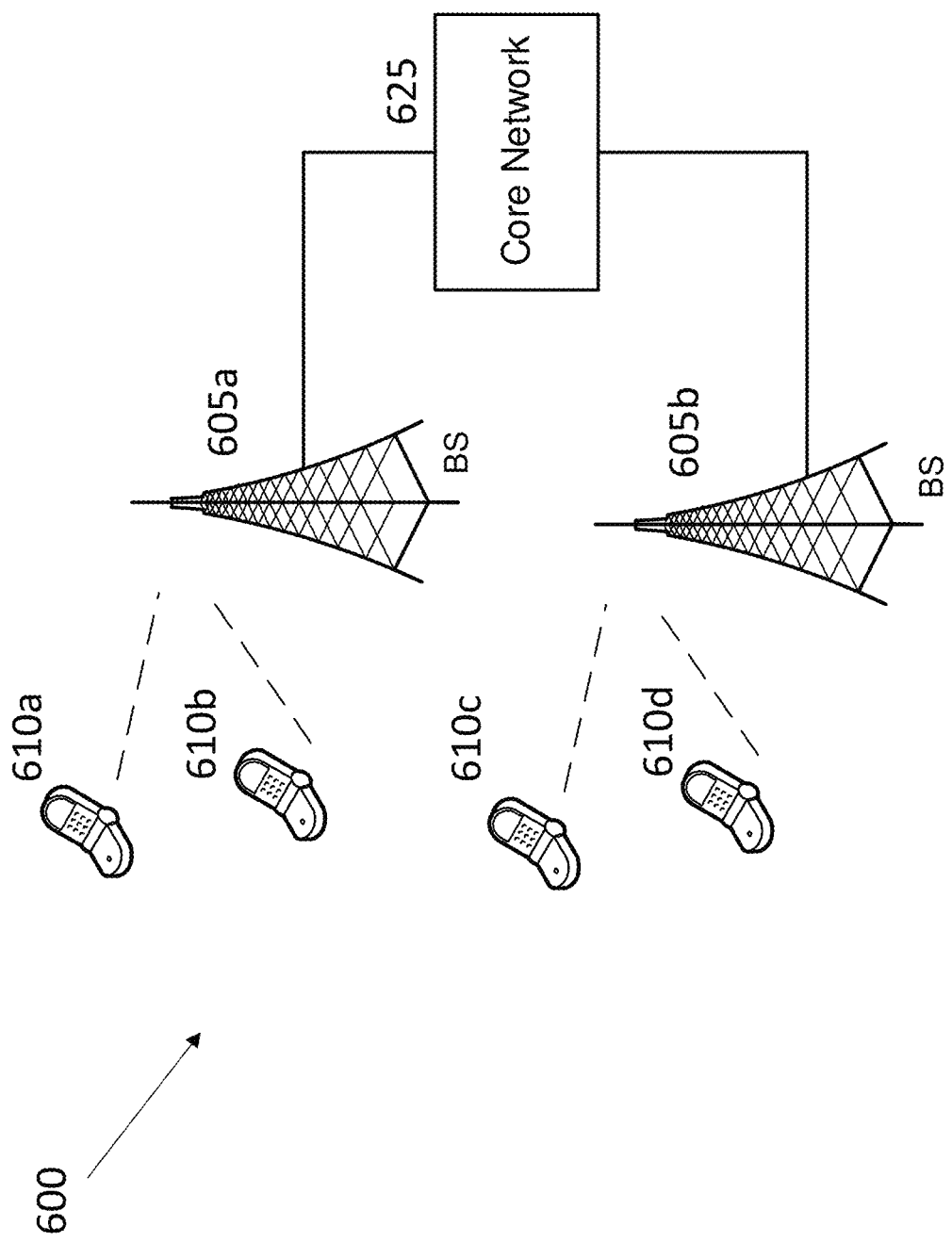
FIG. 6 shows an example of a wireless communication system where techniques in accordance with one or more embodiments of the present technology can be applied.

FIG. 6 shows an example of a wireless communication system 600 where techniques in accordance with one or more embodiments of the present technology can be applied. A wireless communication system 600 can include one or more base stations (BSs) 605a, 605b, one or more wireless devices 610a, 610b, 610c, 610d, and a core network 625. A base station 605a, 605b can provide wireless service to wireless devices 610a, 610b, 610c and 610d in one or more wireless sectors. In some implementations, a base station 605a, 605b includes directional antennas to produce two or more directional beams to provide wireless coverage in different sectors.

The core network 625 can communicate with one or more base stations 605a, 605b. The core network 625 provides connectivity with other wireless communication systems and wired communication systems. The core network may include one or more service subscription databases to store information related to the subscribed wireless devices 610a, 610b, 610c, and 610d. A first base station 605a can provide wireless service based on a first radio access technology, whereas a second base station 605b can provide wireless service based on a second radio access technology. The base stations 605a and 605b may be co-located or may be separately installed in the field according to the deployment scenario. The wireless devices 610a, 610b, 610c, and 610d can support multiple different radio access technologies.

Figure 7:
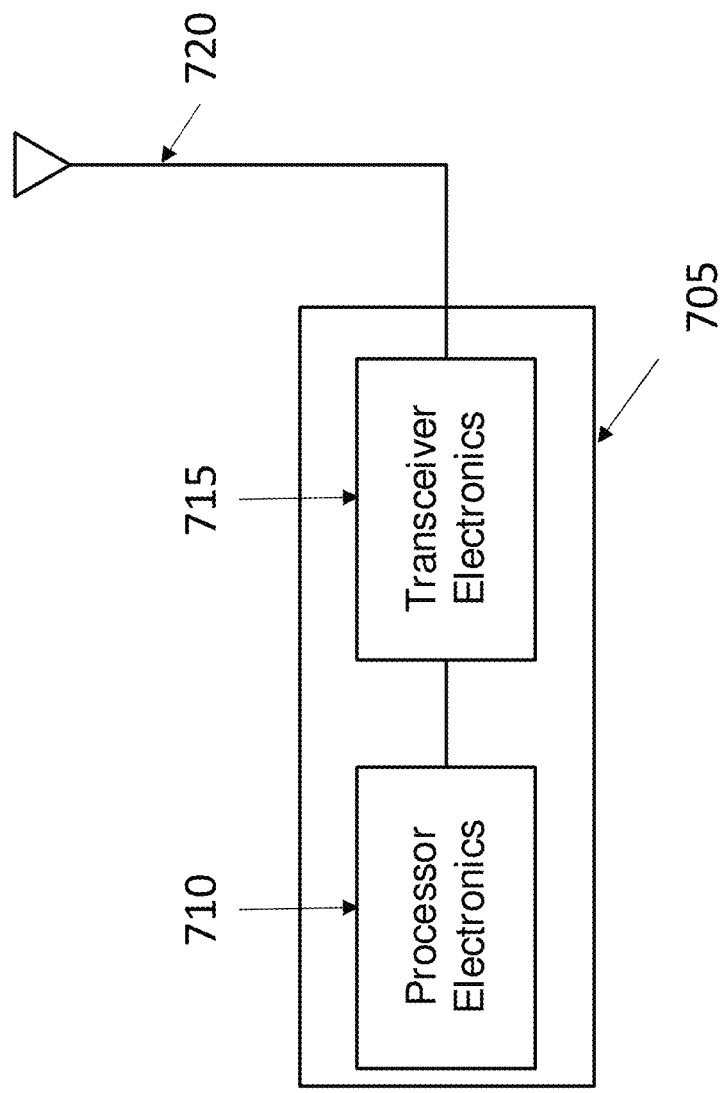
FIG. 7 is a block diagram representation of a portion of a radio station in accordance with one or more embodiments of the present technology can be applied.

FIG. 7 is a block diagram representation of a portion of a radio station in accordance with one or more embodiments of the present technology can be applied. A radio station 705 such as a base station or a wireless device (or UE) can include processor electronics 710 such as a microprocessor that implements one or more of the wireless techniques presented in this document. The radio station 705 can include transceiver electronics 715 to send and/or receive wireless signals over one or more communication interfaces such as antenna 720. The radio station 705 can include other communication interfaces for transmitting and receiving data. Radio station 705 can include one or more memories (not explicitly shown) configured to store information such as data and/or instructions. In some implementations, the processor electronics 710 can include at least a portion of the transceiver electronics 715. In some embodiments, at least some of the disclosed techniques, modules or functions are implemented using the radio station 705.

It will be appreciated that the present document discloses techniques that can be embodied in various embodiments to efficiently signal sub-band information from the base station without introducing huge signaling overhead to achieve better transmission performance. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:
receiving, by a user device from a base station, a first message that includes a first set of information for configuring a transmission from the user device to the base station, the first message including at least one field indicating an association between the first message and a second message for configuring the transmission;
receiving, by the user device, the second message from the base station, the second message including a second set of information for configuring the transmission; and
performing the transmission based on the first and the second set of information;
wherein a time-domain position of a second search space of the second message is determined based on an offset between a first search space of the first message and the second search space of the second message; or
wherein the at least one field of the first message indicates whether the user device is to monitor the second message on a downlink control channel, and wherein the at least one field further indicates an aggregation level or a physical downlink control channel candidate of the second message.

2. The method of claim 1, further comprising:
determining, according to the first message, at least one of the physical downlink control channel candidate or the aggregation level of the second message; and
monitoring the second message based on the physical downlink control channel candidate or the aggregation level.

3. The method of claim 2, wherein the aggregation level or the physical downlink control channel candidate of the second message is determined based on at least one of:
a payload size of the second message;
one or more fields of the first message;
a target code rate;
a control channel parameter of the first message; or
one field of the at least one field indicating the association between the first message and the second message for configuring the transmission, the one field indicating:
one or more transmit precoding matrix indicators or a number of layers, or
a combination of the aggregation level and the physical downlink control channel candidate of the second message.

4. A method for wireless communication, comprising:
transmitting, from a base station to a user device, a first message that includes a first set of information for configuring a transmission from the user device to the base station, the first message including at least one field indicating an association between the first message and a second message for configuring the transmission;
transmitting, from the base station to the user device, the second message including a second set of information for configuring the transmission; and
performing the transmission with the user device based on the first and the second set of information,
wherein a time-domain position of a second search space of the second message is determined based on an offset between a first search space of the first message and the second search space of the second message; or
wherein the at least one field of the first message indicates whether the user device is to monitor the second message on a downlink control channel, and wherein the at least one field further indicates an aggregation level or a physical downlink control channel candidate of the second message.

5. The method of claim 4, wherein at least one of the physical downlink control channel candidate or the aggregation level of the second message is determined based on the first message.

6. The method of claim 5, wherein the aggregation level or the physical downlink control channel candidate of the second message is determined based on at least one of:
a payload size of the second message;
one or more fields of the first message;
a target code rate;
a control channel parameter of the first message; or
one field of the at least one field indicating the association between the first message and the second message for configuring the transmission, the one field indicating:
one or more transmit precoding matrix indicators or a number of layers, or
a combination of the aggregation level and the physical downlink control channel candidate of the second message.

7. A wireless communication apparatus comprising a processor and a memory storing instructions, execution of which by the processor causes the apparatus to:
receive from a base station, a first message that includes a first set of information for configuring a transmission from the apparatus to the base station, the first message including at least one field indicating an association between the first message and a second message for configuring the transmission;

receive the second message from the base station, the second message including a second set of information for configuring the transmission; and perform the transmission based on the first and the second set of information;

wherein a time-domain position of a second search space of the second message is determined based on an offset between a first search space of the first message and the second search space of the second message; or wherein the at least one field of the first message indicates whether the apparatus is to monitor the second message on a downlink control channel, and wherein the at least one field further indicates an aggregation level or a physical downlink control channel candidate of the second message.

8. The apparatus of claim 7, wherein the apparatus is further caused to:

determine, according to the first message, at least one of the physical downlink control channel candidate or the aggregation level of the second message; and monitor the second message based on the physical downlink control channel candidate or the aggregation level.

9. The apparatus of claim 8, wherein the aggregation level or the physical downlink control channel candidate of the second message is determined based on at least one of:

a payload size of the second message;

one or more fields of the first message;

a target code rate;

a control channel parameter of the first message; or one field of the at least one field indicating the association between the first message and the second message for configuring the transmission, the one field indicating:

one or more transmit precoding matrix indicators or a number of layers, or a combination of the aggregation level and the physical downlink control channel candidate of the second message.

10. A wireless communication apparatus comprising a processor and a memory storing instructions, execution of which by the processor causes the apparatus to:

transmit, to a user device, a first message that includes a first set of information for configuring a transmission from the user device to the apparatus, the first message including at least one field indicating an association between the first message and a second message for configuring the transmission;

transmit, to the user device, the second message including a second set of information for configuring the transmission; and perform the transmission with the user device based on the first and the second set of information;

wherein a time-domain position of a second search space of the second message is determined based on an offset between a first search space of the first message and the second search space of the second message; or wherein the at least one field of the first message indicates whether the user device is to monitor the second message on a downlink control channel, and wherein the at least one field further indicates an aggregation level or a physical downlink control channel candidate of the second message.

11. The apparatus of claim 10, wherein at least one of the physical downlink control channel candidate or the aggregation level of the second message is determined based on the first message.

12. The apparatus of claim 11, wherein the aggregation level or the physical downlink control channel candidate of the second message is determined based on at least one of:

a payload size of the second message;

one or more fields of the first message;

a target code rate;

a control channel parameter of the first message; or one field of the at least one field indicating the association between the first message and the second message for configuring the transmission, the one field indicating:

one or more transmit precoding matrix indicators or a number of layers, or a combination of the aggregation level and the physical downlink control channel candidate of the second message.

* * * * *